UNITED STATES PATENT OFFICE.

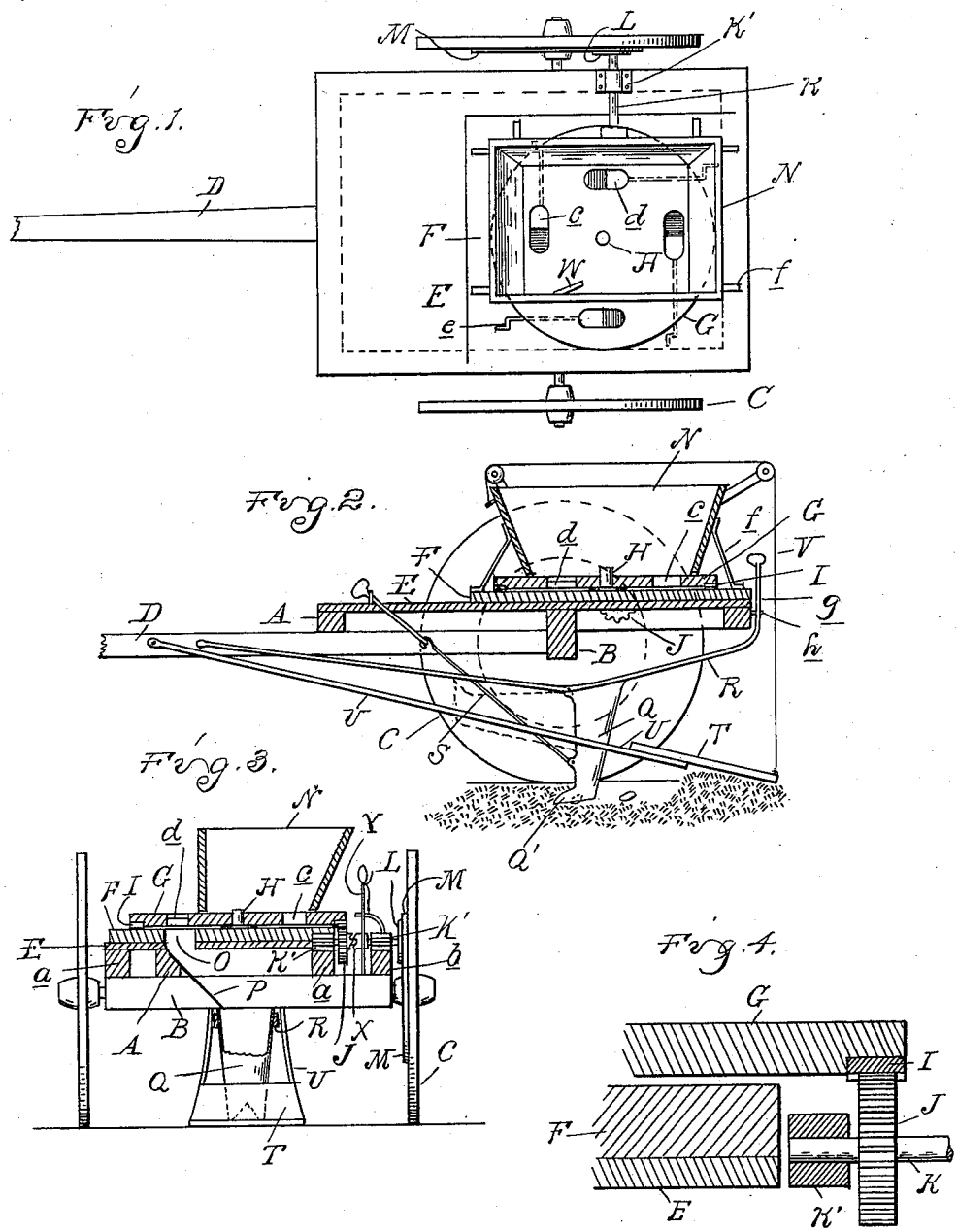

JOHN SKINNER, OF DAVISON, MICHIGAN, ASSIGNOR OF ONE-THIRD TO RIVINGSTON ASHLEY, OF SAME PLACE.

POTATO-PLANTER.

SPECIFICATION forming part of Letters Patent No. 606,901, dated July 5, 1898.

Application filed October 6, 1897. Serial No. 654,279. (No model.)

*To all whom it may concern:*

Be it known that I, JOHN SKINNER, a citizen of the United States, residing at Davison, in the county of Genesee and State of Michigan, have invented certain new and useful Improvements in Potato-Planters, of which the following is a specification, reference being had therein to the accompanying drawings.

The invention consists in the peculiar construction, arrangement, and combination of parts, as more fully hereinafter described and claimed.

In the drawings, Figure 1 is a plan view of my potato-planter. Fig. 2 is a vertical central longitudinal section thereof. Fig. 3 is a cross-section. Fig. 4 shows a portion of Fig. 3 on an enlarged scale.

A is a suitable frame supported on the axle B of the ground-wheels C and provided at its forward end with the tongue D.

E is a platform, preferably completely covering the frame and having the raised portion F, on which is mounted the carrier disk or wheel G. This disk is pivoted upon a pin H, secured to the platform F, and is provided on its under side with the peripheral rack I, which meshes with a pinion J, secured upon the shaft K, journaled in bearings K' in the frame, and at the opposite end of which is secured the pinion L, meshing with a gear-wheel M upon one of the ground-wheels. The bearings K' are preferably secured upon the upper side of the bars $a$ and $b$ of the frame, and the raised platform F is of different height to hold the rack I on the disk in proper engagement with the pinion L. The disk G is provided with a series of apertures or pockets $c$, arranged concentrically around the pivot H, each having a plate $d$ slidingly secured thereon and in a recess in the under side of the disk and engaging with a screw-thread rod $e$, extending to the edge of the disk, by means of which the plates may be adjusted to increase or diminish the size of the pocket.

N is a hopper supported above the disk G by means of the brackets $f$ on the platform, said hopper being so arranged as to cover the greater part of the disk, but to leave one side thereof outside the hopper.

O is an aperture in the platform F, with which the apertures or pockets $c$ are adapted to register when brought by the rotation of the disk outside of the hopper.

P is an inclined chute beneath the aperture O, extending downward toward the center of the machine, and Q is the delivery-tube, extending downward from this chute. The tube Q is carried by a frame R, comprising separate side bars pivotally secured at their forward ends to opposite sides of the tongue and connected at their rear ends with a notched arm $g$, which is vertically adjustably engaged with a supporting lug or pin $h$ on the rear of the frame. The tube Q is hinged to the frame R, so that it may be swung from a vertical to a horizontal position, being held in its adjusted position by a rod S, secured thereto and extending up through the platform near its forward end, where it is adjustably secured, preferably by being notched and engaging with a lug on the platform. The lower end of the tube Q is formed with a shoe or digging-point Q', adapted to make a furrow in which the potatoes may be dropped.

T is a covering-board in rear of the tube Q and secured to the rods U, extending up to the tongue and pivotally secured thereto.

V is a hoisting-cord connection secured to the covering-board T and passing upward and over sheaves in the hopper is secured to a pin or lug on the forward side thereof.

In practice, the hopper being filled with potatoes, the operator lowers the frame by means of the arm $g$, so as to bring the shoe Q' the proper depth in the earth. In the forward movement of the machine the motion of the ground-wheel will be imparted, through the gears M and L, the shaft K, and the pinion J, to the rack I on the disk G. This will rotate said disk, the pockets $c$ of which will fill with potatoes, and carry them around outside of the hopper, where they will be discharged through the aperture O in the platform F. In passing beneath the wall of the hopper a knife W, secured thereto, will cut off a portion of any potato which may be too large to pass out. After passing through the aperture O the potatoes are directed by the chute P into the upper end of the tube Q, where they fall into the ditch dug by the shoe Q'. The tube being open in rear of said shoe, the potatoes will remain in the ditch as the machine moves forward and will then be covered by the board T, which scrapes the earth thrown up by the shoe Q' back into the ditch again. The depth of planting may be regulated by an adjustment of the arm $g$, and when the machine is on or off from the field the tube Q may be turned up into a horizontal position by the rod S and the covering-board T may be raised by the cord V. A clutch X, controlled by a lever Y, is also placed in a convenient point in the drive mechanism, by means of which the rotation of the disk may be stopped when the machine is not planting.

What I claim as my invention is—

1. In a potato-planter, the combination with the ground-wheels, the main frame having a forwardly-projecting tongue and seed-carrier on the frame, of a planter-tube-carrying frame comprising separated bars pivotally connected at their forward ends to the tongue, and having at the rear ends an upwardly-extending arm or handle at the rear of the platform, vertically, adjustably secured to said main frame, a planter-tube pivotally secured to the planter-tube-carrying frame, and an adjustable brace-rod for holding said planter-tube in either its vertical or horizontal positions.

2. In a potato-planter, the combination with the ground-wheels and the frame supported therein, of the raised platform F on said frame having the aperture O therein, the disk G rotatorily secured upon the pivot H, having the apertures or pockets $c$ arranged concentrically around the pivot and adapted to register with the aperture O and the circular rack I secured to the under side of the disk near the periphery thereof, a drive connection for said disk from one of the ground-wheels, comprising the shaft K the pinions J and L and the gear-wheel M on said ground-wheel, a hopper secured to the platform above said disk but to one side of the aperture O and in such position that the pockets $c$ pass therebeneath, a vertically-adjustable planter-tube beneath the platform and adapted to catch the potatoes discharged from the aperture O and a coverer in rear of said planter-tube, substantially as described.

3. In a potato-planter the combination with the hopper, of the rotary feed-disk having pockets therein, slide-plates one for each pocket, and means adapted to be operated from the periphery of said disk for moving said slides to regulate the size of the pockets, substantially as described.

In testimony whereof I affix my signature in presence of two witnesses.

JOHN SKINNER.

Witnesses:
   M. B. O'DOGHERTY,
   OTTO F. BARTHEL.